United States Patent [19]

Hagen

[11] 4,028,949

[45] June 14, 1977

[54] METHOD AND MEANS FOR OPERABLY INTERCONNECTING MOVABLE PARTS

[76] Inventor: Magnus F. Hagen, 3713 Twilight Drive, Fullerton, Calif. 92632

[22] Filed: Dec. 3, 1975

[21] Appl. No.: 637,414

Related U.S. Application Data

[63] Continuation of Ser. No. 466,782, May 3, 1974, abandoned.

[52] U.S. Cl. .................................. 74/25; 74/89.2; 74/110; 74/221; 74/229
[51] Int. Cl.² ..................... F16H 21/44; F16H 7/00
[58] Field of Search ................. 74/29, 89.17, 89.2, 74/110, 229, 221, 25; 312/332, 348; 308/3.8, 3.6, 3 R

[56] References Cited

UNITED STATES PATENTS

| | | | |
|---|---|---|---|
| 1,079,927 | 11/1913 | Bradner | 308/3.8 |
| 2,941,410 | 6/1960 | Ota | 74/229 |
| 3,010,328 | 11/1961 | Forey | 74/110 |
| 3,078,129 | 2/1963 | Beeck | 308/3.8 |
| 3,143,895 | 8/1964 | Robie | 74/229 |
| 3,521,939 | 7/1970 | Fall et al. | 312/348 |
| 3,679,275 | 7/1962 | Fall et al. | 308/3.8 |
| 3,950,040 | 4/1976 | Fall | 308/3.8 |
| 3,966,273 | 6/1976 | Hagen et al. | 308/3.8 |

*Primary Examiner*—Samuel Scott
*Assistant Examiner*—Allan R. Burke
*Attorney, Agent, or Firm*—J. Carroll Baisch

[57] ABSTRACT

A synchronizing mechanism comprising at least two flat strips of friction material (bristles) co-acting with at least one intermediate member formed by an endless belt of friction material (bristles) having belt supporting means. When the strips are moved longitudinally or linearly relative to each other, the endless belt also moves longitudinally between said strips. With such movement, the bristles at the looped ends of the belt progressively roll into and out of engagement with the bristles of the strips. However, the parts of the band intermediate the ends thereof, frictionally resist linear or longitudinal movement between said strips thereby synchronize movement between said strips.

20 Claims, 21 Drawing Figures

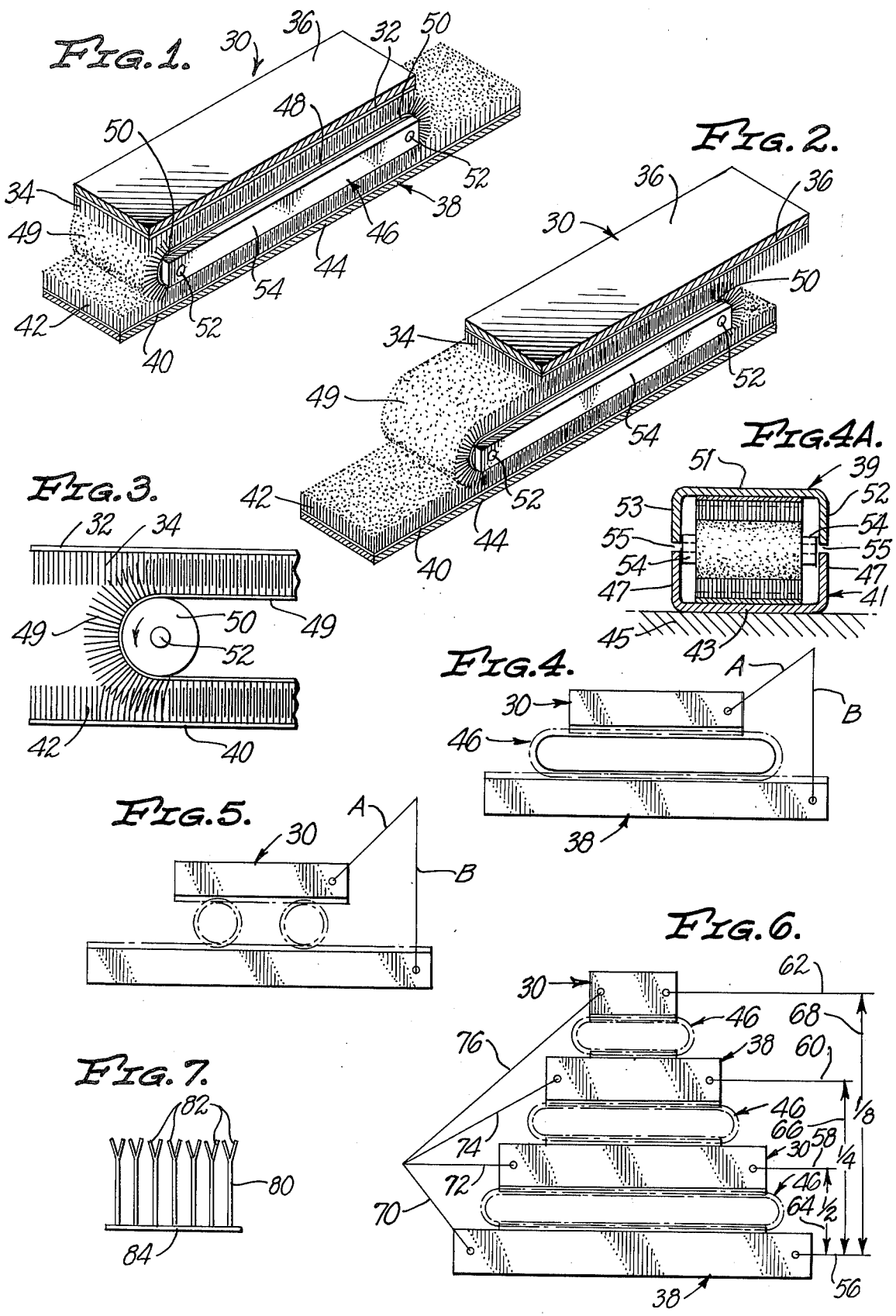

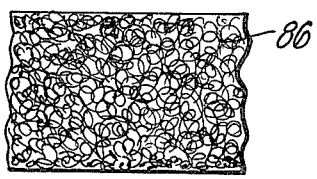
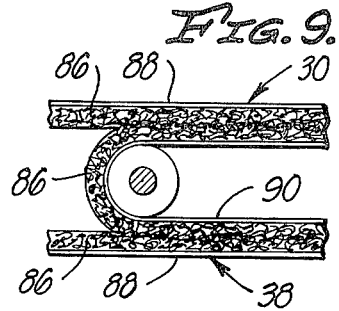
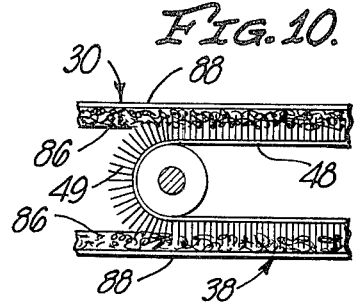
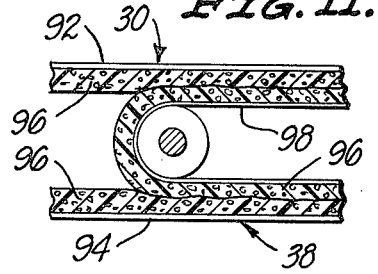
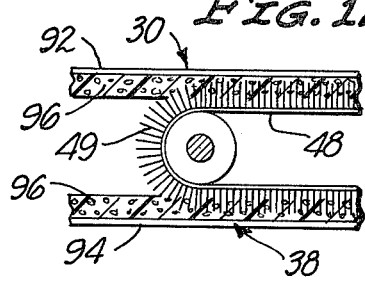
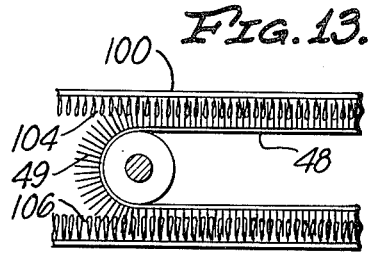
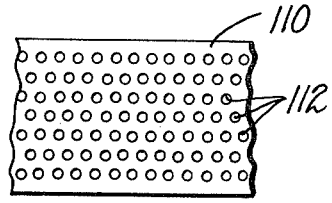
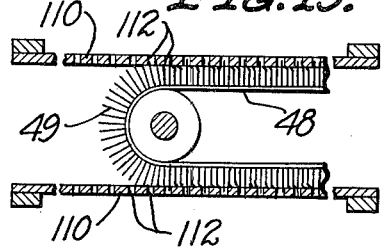
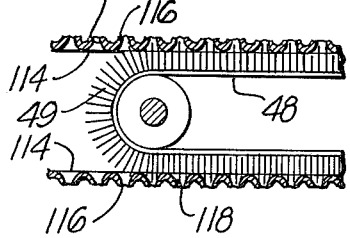
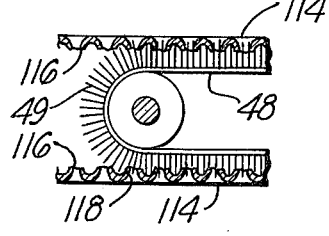
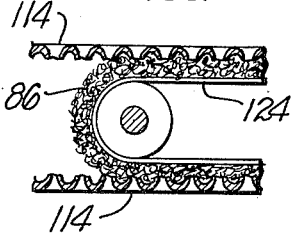
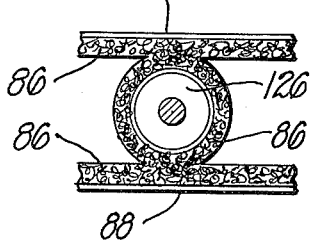
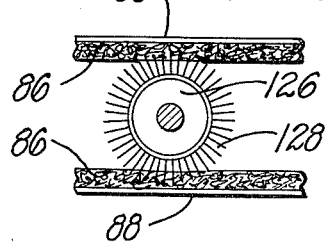

METHOD AND MEANS FOR OPERABLY INTERCONNECTING MOVABLE PARTS

This is a continuation of application Ser. No. 466,782, filed May 3, 1974, now abandoned.

BACKGROUND OF THE INVENTION

1. Field of the Invention

This invention relates generally to an assembly or organization of means for actuating at least one part of such assembly or organization and/or for precisely maintaining the relationship of various longitudinally movable parts.

2. Description of the Prior Art

Various arrangements have been proposed for maintaining the relationship between various longitudinally movable parts but these generally have not been satisfactory.

SUMMARY OF THE INVENTION

The invention resides in an assembly or organization of means for actuating at least part of such assembly or organization and/or for precisely maintaining the relationship of various longitudinally movable parts. This means comprises two layers (or multiples thereof) of strips of friction material rigidly mounted in substantially parallel planes which are operably spaced apart, at least one of said strips being movable linearly or longitudinally relative to the other. Between said planes is a continuous flexible band or belt being mounted at the respective looped ends on means such as rollers, for permitting or causing longitudinal movement of parts of the band or belt intermediate the ends, and in causing rotary movement of the end parts of said band or belt. The intermediate parts of the band or belt are parallel to and frictionally engage the respective adjacent strips of friction material as said band or belt travels longitudinally between the strips of friction material. The mechanism, organization or apparatus may be operated manually or by power means such as an electric motor or other suitable means connected to a movable part.

The foregoing describes the basic inventive concept, which has various uses. For example, it may be embodied in an arrangement wherein a strip of friction material and the band are operably interconnected and movement of one of these parts will actuate the other. Also, in place of the band, a roller having friction material thereon and in engagement with the strip may be used. Examples of other uses are in telescoping ball bearing slide mechanisms, especially precision ball bearing telescoping slide mechanisms, conveyor mechanisms, escalator or rolling steps, typewriter carriages, etc. It is especially useful where very precise operation is required and to retain precise relationships between operable parts.

OBJECTS AND ADVANTAGES OF THE INVENTION

It is an object of the invention to provide a unique interconnecting means, arrangement or organization for actuating one part by another part.

Another object is to provide an arrangement or organization of this character for precisely maintaining the relationship of various longitudinally or linearly movable parts.

It is still another object of the present invention to provide a mechanism that has an effective frictional connection between operating parts.

It is a further object of the invention to provide a mechanism of this character, wherein the relationship between the various members or parts thereof are precisely synchronized.

A still further object of the invention is to provide a mechanism of this character having random interconnecting or intermeshing means between the friction material of the parts.

Another object of the invention is to provide mechanism of this character wherein such intermeshing means comprises bristles.

Still another object of the invention is to provide a mechanism of this character wherein various other types of random interconnecting or holding means frictionally interconnects the various parts.

A further object of the invention is to provide a mechanism of this character using strips having straight bristles attached to the longitudinally aligned members arranged in spaced parallel relationship and a traveling band also using straight bristles operably engaging the bristles of the strips.

A still further object of the invention is to provide an arrangement of this character wherein the operation of the bristles of the strips and band requires a minimum force.

Another object of the invention is to provide an arrangement of this character wherein the bristles of the band roll into engagement with the bristles of the strips or roll out of such engagement.

A still another object of the invention is to provide an arrangement that does not require extreme precision in manufacturing and yet provide a precise and positive relationship of the band relative to the strips and with an exact constant positioning. That is, due to the synchronization provided, it is assured that the band assembly will be at all times exactly related to the movements of the movable strip versus the stationary strip.

A further object of the invention is to provide an apparatus of this character with which the length of the mechanism is practically unlimited.

A still further object of the invention is to provide mechanism of this character that has reliable long life.

Another object of the invention is to provide mechanism or apparatus of this character that is relatively inexpensive to manufacture and install and which requires minimum of servicing.

The characteristics and advantages of the invention are further sufficiently referred to in connection with the following detailed description of the accompanying drawings, which represent one embodiment. After considering this example, skilled persons will understand that many variations may be made without departing from the principles disclosed and we contemplate the employment of any structures, arrangements or modes of operation that are properly within the scope of the appended claims.

BRIEF DESCRIPTION OF THE DRAWINGS

Referring to the drawings, which are for illustrative purposes only:

FIG. 1 is a schematic perspective view of the means for precisely maintaining the relationship of various longitudinally movable parts, the parts being shown in one relationship;

FIG. 2 is a similar view showing the parts of the assembly in another relationship;

FIG. 3 is an enlarged fragmentary schematic side elevational view showing the rolling engagement and disengagement of the bristles on the traveling band with the bristles of the adjacent strips;

FIG. 4 is a schematic side view of the mechanism embodying the present invention;

FIG. 4A is a cross-sectional view showing the apparatus with guide means for keeping the captive parts in proper alignment with each other and keeping the intermeshed bristles together;

FIG. 5 is an alternative arrangement showing rollers with friction material thereon, the rollers being disposed between the assemblies having friction material thereon.

FIG. 6 is a schematic side elevational view of another alternative arrangement;

FIG. 7 is an enlarged schematic fragmentary view showing an alternative type of bristles:

FIG. 8 is a top plane fragmentary view of an alternative friction material. This alternative friction material being resilient foam or similar material;

FIG. 9 is a fragmentary schematic side elevational view of the mechanism using the friction material of FIG. 8;

FIG. 10 is a view similar to FIG. 9 but showing bristles on the traveling band;

FIG. 11, 12 and 13 are similar views showing alternative arrangements;

FIG. 14 is a fragmentary top plane view of another alternative type of material for interconnecting various parts of the mechanism;

FIGS. 15, 16, 17 and 18 are still further alternative arrangements; and

FIGS. 19 and 20 show still another further alternative arrangements of the invention.

DESCRIPTION OF THE PREFERRED EMBODIMENTS

Referring to FIGS. 1, 2 and 3, there is shown an arrangement or organization of parts embodying the present invention. There is an assembly, indicated generally at 30, which includes a straight strip 32 of fabric, plastic or any other suitable material having bristles 34 on one side. The strip 32 is secured to a rigid support 36 by an adhesive or any other suitable means.

A second assembly indicated generally at 38, includes a strip 40 which may be similar to the strip 32. Strip 40 carries bristles 42 and said strip 40 is secured by adhesive or any other suitable means to a support 44. The assemblies 30 and 38 are in longitudinal alignment, parallel to each other and spaced apart, the bristles of these assemblies face each other.

Between the assemblies 30 and 38 is what is termed a traveling belt assembly indicated generally at 46 and comprises a flexible endless belt or band 48 of any suitable material such as fabric, plastic or the like. Said belt or band has bristles 49 on its outer side and is looped at the ends, there being rollers 50 within each looped end. Rollers 50 extend transversely of the band or belt and are spaced apart longitudinally relative to said belt or band. Rollers 50 have stubbed shafts 52 at each end and there is a bar 54 at each side having bearing openings for said shafts 52 to thereby retain the rollers in proper longitudinally spaced relationship relative to the band or belt. Thus, the assembly 46 will travel longitudinally with the respect to the assemblies 30 and 38 and the bristles of the belt or band mesh with the bristles 34 and 42 of the respective assemblies 30 and 38.

In the arrangement shown in FIGS. 1, 2 and 3, the bristles are straight and/or are flexible although in some arrangements, some or all of the bristles may not be.

The supports 36 and 44 of the respective assemblies 30 and 38 are flat and rigid and the assemblies 30 and 38 are adapted to move longitudinally relative to each other and as one or both of them move, the band or belt 48, which is termed herein a traveling band, moves longitudinally between the assemblies 30 and 38.

The linear control motion of the assemblies 30 and 38 relative to each other, is accomplished by a moving force in a linear direction. When in operative position, the bristles of the band part adjacent assembly 30 are intermeshed or interengaged with the bristles of the strip 32 of the assembly 30 and the bristles of that part of band or belt 48 are intermeshed with the bristles of said assembly 38.

Assuming that assembly 38 is stationary while assembly 30 is longitudinally movable. During longitudinal movement assembly 30 to the right, as viewed in FIGS. 1, 2 and 3, band 48 will travel longitudinally between assemblies 30 and 38. As assembly 30 moves to the right, the band will be moved in the same direction and the bristles at the right hand end will be moved by a rolling movement and mesh with the bristles of the assembly 38, while at the same time, the bristles of the band or belt will be pulled or rolled outwardly of the bristles of the assembly 30. At the opposite end, the bristles 49 of the band or belt will be pulled out by a rolling motion from meshing with the bristles 42 of the assembly 38 and will be rolled into mesh with the bristles 34 of the assembly 30. Thus, the intermeshing or interengagement and disengagement of the bristles of the band with the bristles of the strips occurs simultaneously.

While the bristles 49 at the looped ends of the traveling belt or band are meshed with and pulled out of mesh from the bristles of the assemblies 30 and 38 with a rolling motion, the bristles between the looped ends of the band or belt, are securely meshed with the adjacent bristles of the assemblies 30 and 38 so that linear or longitudinal displacement is prevented.

In other words, depending on the length and relationship of the assemblies 30 and 38, and the traveling belt assembly 46, the bristles at the looped ends of the band or belt which are on the parts of the band extending around the rollers 50, are rotatably moved into and out of engagement with the bristles of the assemblies 30 and 38. The connection thus provided between the assemblies 30 and 38 and the traveling band or belt 48 is such that at no time will these parts get out of exact relationship or positions relative to each other. However, the rolling on or off action of the bristles of the band from the bristles of the assemblies 30 and 38 is effected with very little resistance so that the parts will move relatively freely. Thus, the positions of the three assemblies will always hold an exact, directly controlled relationship throughout any motion. If assembly 38 in stationary, assembly 30 travels distance X, and the band will travel X/2. In other words, the band will travel at ½ the rate and ½ the distance traveled by assembly 30. Putting it another way, assembly 30 will travel twice as fast and twice the distance as band 48.

A further advantage of this invention is the ability of the three-layer relationship to withstand considerable destructive elements within the bristle to bristel or similar engagement due to the bristle type of surface engagements. Even though some of the bristles might be broken off or pulled out the exact relationship of the parts relative to each other, will be maintained. Also, the extremely accurate tolerances required in certain other types of mechanisms, are not required. Should there be sufficient longitudinal force applied to any of the parts, such as would result in a forceful overriding of the built-in resistance, disengagement of the bristles would not cause destruction of the parts. Another important advantage of the present invention is its greatly improved long-life reliability.

The engagement of the bristles of the belt or band 48 with the bristles of assemblies 30 and 38 can provide a wide range of accommodation of tolerances in various types of construction and the various densities, thickness and length of the bristle movements and the added wide range of flexibility of band or belt 38 and engagement of bristle to bristle at random throughout the surface engagements is highly effective. The interengagement of the bristles of the band or belt between the looped ends thereof, effectively resists shear so that there is a very positive connection between such bristles and the bristles of adjacent parts.

Referring to FIGS. 4 and 5, there is shown diagramatically how the relationship of the assemblies is controlled at all times. This is indicated by the lines A and B.

In FIG. 4, the assembly 46 is disposed between the assemblies 30 and 38. The assemblies 30 and 38 and said assembly 46 includes a band with friction material thereon for frictional engagement with the friction material of the assemblies 30 and 38.

In FIG. 4A, there are channel shaped guides 39 and 41. The bottom part 43 of guide 41 rests on support means 45 while the sides 47 of the guide 41 partly overlap the outer sides of bars 54 to guide them and thereby keep the belt assembly 46 in position and alignment with the strip assemblies 30 and 38. Guide 39 is also fixed and the bottom 51 has a fixed relationship with the bottom 43 of guide 41 to hold the intermeshed bristles in mesh. Sides 53 of guide 39 also overlap part of the bars 54. The free adjacent edges of the sides 47 and 53 are spaced apart leaving spaces 55 through which actuating members, not shown, may extend and be connected to the bars 54 for longitudinally moving the band assembly 46. If the strip assembly 38 is fixed, either the strip assembly 30 or the band assembly 30 may have a connection at an end with operating means.

In FIG. 5, the assembly 46 comprises rollers B having friction material thereon, said rollers being disposed between the assemblies 30 and 38 with the friction material on said rollers in frictional and random engagement with the friction material of said assemblies 30 and 38.

Referring to FIG. 6, which shows an organization of several assemblies and shows how they are in the same controlled relationship to each other at all times. These relationships and ratios of movement are shown by the horizontal lines 56, 58, 60 and 62 and the vertical lines 64, 66 and 68 with the ratios indicated in parenthesis in connection with the vertical lines. The controlled relationship of the various assemblies is also shown by the lines 70, 72, 74 and 76 at the left hand side of the arrangement shown in FIG. 6.

FIG. 7 is a greatly enlarged schematic view of bristles. The bristles are indicated at 80 and have split ends as at 82. These bristles are on a backing strip 84 which may be of the same type of material as hereinabove described in connection with the backing strips in the arrangement shown in FIGS. 1, 2 and 3.

In FIG. 8, there is shown foam material 86 with rather large pores, which is also friction material.

In FIG. 9, the strips for the assemblies 30 and 38, have the foam material 86 secured to backing material 88 and the belt or band, which is indicated at 90, also uses the foam material 86. The foam material of the band has compressive engagement with the foam material of the strips.

FIG. 10 shows an arrangement wherein the strips for the assemblies 30 and 38 use the foam material 86 while the belt or band is the same as the belt or band shown in FIGS. 1, 2 and 3 and has the same reference mesh with the foam material 86 of the assemblies 30 and 38.

In FIG. 11, the strips are indicated at 92 and 94 of the assemblies 30 and 38 and said strips have foam material 96 thereon, the foam material 96 having smaller pores than the material shown in FIG. 8. The band in this arrangement is indicated at 98 and has the same type of foam material 96 as the strips 90 and 94.

FIG. 12 shows a similar arrangement except the band and bristle arrangement is the same as in the mechanism of FIGS. 1, 2, 3 and 10.

FIG. 13 shows another alternative arrangement wherein the strips are indicated at 100 and 102 and have looped bristles 104 and 106. The belt or band is indicated at 48 and has straight bristles 49. It is to be understood that the bristles 49 may have split ends such as the bristles 80 (FIG. 7) or may have hooked ends. In this arrangement of FIG. 13, the disengagement of the bristles 49 from the bristles 104 and 106, offers greater resistance with split or hooked end than where the bristles are straight.

Referring to FIG. 14, there is shown a perforated metal strip 110, there being a plurality of perforations 112 which may be of various sizes depending on the type of installation desired. These strips are embodied in the arrangement shown in FIG. 15 and the belt or band 48 has the bristles 49 which are adapted to enter into the perforated openings 112 of the strips 110.

FIG. 16 shows another type of metal strips which are indicated at 114. These strips have pressed-out parts 116 with openings 118 at the free ends. The pressed out parts are outwardly facing so that the bristles 49 of band 48 enter the opposite sides of the strips 114.

In FIG. 17, the pressed out parts 116 face inwardly so that the bristles 49 will enter the openings 118 at the free ends of the pressed out parts 116.

In FIG. 18, the metal strips 114 are arranged similarly to the arrangement in FIG. 17 and the belt or band 124 has the foam material 86 thereon for engagement with the adjacent sides of the strips 114.

FIG. 19 shows another alternative arrangement of the invention wherein the strips and friction material are the same as in FIG. 9 with the strips indicated at 88 and the friction material at 86. Instead of a band in this arrangement, there is a roller 126 with material 86 thereon for engagement with the material 86 of the respective strips 88.

FIG. 20 shows a still further alternative arrangement with the strips 88 having material 86 thereon. Roller 126 in this arrangement, has bristles 128 thereon for frictional and random engagement with the material 86 of the strips 88.

The invention and its attendant advantages will be understood from the foregoing description and it will be apparent that various changes may be made in the form, construction and arrangement of the parts without departing from the spirit or scope thereof or sacrificing its material advantages, the arrangement hereinbefore described being merely by way of example and we do not wish to be restricted to the specific form shown or uses mentioned except as defined in the accompanying claims.

I claim:

1. A synchronizing mechanism comprising:
a flat strip of friction material;
means operably supporting said strip;
a second flat strip of friction material in spaced substantially parallel, aligned relationship to the first mentioned strip;
means operably supporting said second strip of friction material;
interconnecting means operably disposed between said strips;
said interconnecting means including a longitudinally extending endless flexible planar belt of friction material;
and spaced means operably supporting said endless belt of friction material planarly for effecting random engagement and operable meshing of respective planar parts of said endless belt of friction material with both strips of friction material, and for disengagement with said strips of friction material.

2. The invention defined by claim 1, wherein said interconnecting means has movement longitudinally of and parallel to said strips for effecting rolling engagement of the belt of friction material thereof with the strips of fricton material and for peeling disengagement from the strips of friction material.

3. The invention defined by claim 2, wherein at least some of the friction material comprises porous foam material.

4. The invention defined by claim 2, wherein the friction material of said strips and of said interconnecting means comprises a plurality of bristles.

5. The invention defined by claim 4, wherein the bristles of said strips and said interconnecting means have split ends to provide (firmer inter-engagement) random and operable meshing with each other.

6. A synchronizing mechanism comprising:
a flat strip of friction material;
means for operably supporting said strip;
a second flat strip of fricton material is spaced substantially-parallel, aligned relationship to the first mentioned strip;
means for operably supporting said second strip of friction material;
interconnecting means, operably disposed between said strips, for interconnecting said strips;
said interconnecting means including an endless belt of friction material;
means, operably supporting said endless belt of friction material, for effecting engagement of respective parts of said endless belt of friction material with both strips of friction material, and for effecting disengagement with said strips of friction material;
said interconnecting means having movement for effecting rolling engagement of the friction material thereof with the strips of friction material, and for effecting rolling disengagement from the strips of friction material;
said belt-supporting means comprising a pair of rollers extending transversely of said strips, and spaced apart from each other longitudinally relative to said strips;
means for operably carrying said rollers, and restricting same to their spaced relationship;
said endless belt having friction material on the outer side thereof, and being operably mounted on said rollers.

7. The invention defined by claim 6, wherein the friction material of said strips and of said belt comprises a plurality of bristles.

8. The invention defined by claim 7, wherein the bristles of said strips are looped at the ends and the bristles for the band have hooked ends.

9. The invention defined by claim 6, wherein the friction material of said strips and of said belt comprises porous foam material.

10. The invention defined by claim 9, wherein the foam material has small pores.

11. The invention defined by claim 6, wherein the friction material of said strips comprise porous foam material, and the friction material of said belt comprises bristles.

12. The invention defined by claim 11, wherein the friction material of said strips comprise foam having small pores.

13. The invention defined by claim 6, wherein the friction material of said strips is a foam having small pores.

14. Means for maintaining the relationship of two parallel, supported strips of friction material; said strips being spaced apart and in alignment with each other and having relative longitudinal movement, and a longitudinally extending endless belt interconnecting means looped over spaced supporting means and being supported planarly between said strips and movable parallel to and longitudinally relative thereto, wherein the friction material of said strips face each other; and the friction material of said interconnecting endless belt means randomly and operably meshing with said strips of friction material in the planar areas between said supporting means, and peeling off for disengagement with said strips of friction material.

15. The invention defined by claim 14, wherein the strips of friction material comprise strips of metal having a plurality of perforations therethrough.

16. The invention defined by claim 15, wherein the friction material for said interconnecting means comprises bristles.

17. The invention defined by claim 15, wherein the interconnecting means comprises an endless flexible belt and the friction material thereof comprises bristles.

18. The invention defined by claim 17, wherein the strip have a plurality of parts pressed outwardly from one surface with perforations at the outer ends of said pressed out parts, the ends of said pressed out parts facing away from each other.

19. The invention defined by claim 15, wherein said strips have a plurality of parts pressed outwardly from one surface with perforations at the ends of said pressed out parts, the pressed out parts of said strips facing each other; and the friction material of said interconnecting endless belt means comprising porous foam material.

20. A synchronizing mechanism comprising:

a flat strip of friction material;
means operably supporting said strip;
a second flat strip of friction material in spaced substantially parallel, aligned relationship to the first mentioned strip;
means operably supporting said second strip of friction material;
interconnecting means operably disposed between said strips;

said interconnecting means including a longitudinally extending endless flexible planar belt of friction material;
and spaced means operably supporting said endless belt of friction material planarly for effecting random engagement and operable meshing of respective planar parts of said endless belt of friction material with both strips of friction material.

* * * * *